US009023445B2

(12) United States Patent
Guzzi et al.

(10) Patent No.: US 9,023,445 B2
(45) Date of Patent: May 5, 2015

(54) COMPOSITE CONTAINERS FOR STORING PERISHABLE PRODUCTS

(71) Applicant: Kellogg Company, Battle Creek, MI (US)

(72) Inventors: Brian Daniel Guzzi, West Chester, OH (US); Robert Paul Cassoni, Waynesville, OH (US)

(73) Assignee: Kellogg North America Company, Battle Creek, MI (US)

( * ) Notice: Subject to any disclaimer, the term of this patent is extended or adjusted under 35 U.S.C. 154(b) by 0 days.

(21) Appl. No.: 13/650,504

(22) Filed: Oct. 12, 2012

(65) Prior Publication Data

US 2013/0092697 A1 Apr. 18, 2013

Related U.S. Application Data

(60) Provisional application No. 61/547,203, filed on Oct. 14, 2011.

(51) Int. Cl.

| | |
|---|---|
| ***B29D 22/00*** | (2006.01) |
| ***B29D 23/00*** | (2006.01) |
| ***B32B 1/08*** | (2006.01) |

(Continued)

(52) U.S. Cl.

CPC ... *B31B 1/00* (2013.01); *B65D 3/04* (2013.01); *B65D 3/12* (2013.01); *B65D 3/22* (2013.01); *B31B 2201/223* (2013.01); *B31B 2217/082* (2013.01); *B65D 15/04* (2013.01)

(58) Field of Classification Search

CPC .............. B65D 3/04; B65D 3/12; B65D 3/22; B65D 15/04

USPC ............. 428/35.7, 36.9, 36.91, 36.6; 220/626

See application file for complete search history.

(56) References Cited

U.S. PATENT DOCUMENTS 3,430,543 A 3/1969 Cunningham
3,695,971 A 10/1972 Corning, Jr.

(Continued)

FOREIGN PATENT DOCUMENTS

CA 2658551 2/2008
CH 601065 6/1978

(Continued)

OTHER PUBLICATIONS

International Search Report, 3 pages, Dated Feb. 8, 2103.

*Primary Examiner* — Michael C Miggins

(74) *Attorney, Agent, or Firm* — Honigman Miller Schwartz and Cohn LLP; Fernando Alberdi; Jonathan P. O'Brien

(57) ABSTRACT

A composite container for storing perishable products may include a composite body and a composite bottom. The composite bottom may include a bottom fiber layer, a bottom oxygen barrier layer, and a bottom sealant layer, such that the composite bottom has an upper surface and a lower surface. A hermetic seal may be formed between a sealing portion of the composite bottom and an interior surface of the composite body. When an internal pressure is applied to the interior surface of the composite body and the upper surface of the platen portion of the composite bottom, an external pressure is applied to the exterior surface of the composite body and the lower surface of the composite bottom, and the internal pressure is about 20 kPa greater than the external pressure, the platen portion of the composite bottom may not extend beyond the bottom edge of the composite body.

29 Claims, 11 Drawing Sheets

(51) Int. Cl.

| | |
|---|---|
| ***B31B 1/00*** | (2006.01) |
| ***B65D 3/04*** | (2006.01) |
| ***B65D 3/12*** | (2006.01) |
| ***B65D 3/22*** | (2006.01) |
| ***B65D 8/00*** | (2006.01) |

(56) References Cited

U.S. PATENT DOCUMENTS

| | | | |
|---|---|---|---|
| 3,949,927 | A | 4/1976 | Smith et al. |
| 4,027,985 | A | 6/1977 | Loesser, III |
| 4,053,103 | A | 10/1977 | Gaudish |
| 4,098,404 | A | 7/1978 | Markert |
| 4,122,790 | A | 10/1978 | Rowe et al. |
| 4,141,463 | A | 2/1979 | Smith |
| 4,155,439 | A | 5/1979 | Fletcher et al. |
| 4,158,425 | A | 6/1979 | Sansbury |
| 4,222,974 | A | 9/1980 | Smith |
| 4,254,889 | A | 3/1981 | Jacobs |
| 4,295,840 | A | 10/1981 | Sansbury |
| 4,343,427 | A | 8/1982 | Sansbury |
| 4,373,928 | A | 2/1983 | Horton |
| 4,374,568 | A | 2/1983 | Horton |
| 4,402,451 | A | 9/1983 | Woerz et al. |
| 4,442,971 | A | 4/1984 | Helms |
| 4,466,553 | A | 8/1984 | Zenger |
| 4,495,209 | A | 1/1985 | Whiteside |
| 4,556,166 | A | 12/1985 | Penttila |
| 4,557,414 | A | 12/1985 | Ford et al. |
| 4,560,063 | A | 12/1985 | Muller |
| 4,692,132 | A | 9/1987 | Ikushima et al. |
| 4,717,374 | A | 1/1988 | Elias |
| 4,760,949 | A | 8/1988 | Elias |
| 4,762,249 | A | 8/1988 | Fortuna et al. |
| 4,852,793 | A | 8/1989 | Homma et al. |
| 5,069,355 | A | 12/1991 | Matuszak |
| 5,076,440 | A | 12/1991 | Drummond |
| 5,084,284 | A | 1/1992 | McDilda et al. |
| 5,152,418 | A | 10/1992 | Kroeschell et al. |
| 5,353,943 | A | 10/1994 | Hayward |
| 5,431,619 | A | 7/1995 | Bacon et al. |
| 5,476,213 | A | 12/1995 | Suski |
| 5,482,205 | A | 1/1996 | Drummond et al. |
| 5,487,506 | A | 1/1996 | Drummond et al. |
| 5,494,215 | A | 2/1996 | Drummond et al. |
| 5,556,364 | A | 9/1996 | Konzal |
| 5,713,824 | A | 2/1998 | Drummond et al. |
| 5,752,614 | A | 5/1998 | Nelson et al. |
| 5,788,112 | A | 8/1998 | Bacon et al. |
| 5,846,619 | A | 12/1998 | Cahill et al. |
| 5,950,913 | A | 9/1999 | Rea et al. |
| 5,971,259 | A | 10/1999 | Bacon |
| 5,979,748 | A | 11/1999 | Drummond et al. |
| 5,988,493 | A | 11/1999 | Clougherty |
| 6,032,823 | A | 3/2000 | Bacon |
| 6,047,878 | A | 4/2000 | Lowry |
| 6,076,728 | A | 6/2000 | Cahill et al. |
| 6,092,717 | A | 7/2000 | Lowry |
| 6,109,470 | A | 8/2000 | Antal, Sr. et al. |
| 6,116,500 | A | 9/2000 | Cahill |
| 6,152,355 | A | 11/2000 | Morrow et al. |
| 6,165,115 | A | 12/2000 | Rea |
| 6,176,070 | B1 | 1/2001 | Grabher |
| 6,196,450 | B1 | 3/2001 | Varadarajan et al. |
| 6,220,471 | B1 | 4/2001 | Lowry |
| 6,230,968 | B1 | 5/2001 | Varadarajan |
| 6,234,386 | B1 | 5/2001 | Drummond et al. |
| 6,244,500 | B1 | 6/2001 | Cahill et al. |
| 6,258,312 | B1 | 7/2001 | Heyn |
| 6,270,004 | B1 | 8/2001 | Drummond et al. |
| 6,290,119 | B1 | 9/2001 | Reese et al. |
| 6,296,600 | B1 | 10/2001 | Drummond et al. |
| 6,302,321 | B1 | 10/2001 | Reese et al. |
| 6,309,717 | B1 | 10/2001 | Qiu et al. |
| 6,350,500 | B1 | 2/2002 | Drummond et al. |
| 6,364,201 | B1 | 4/2002 | Varano |
| 6,378,763 | B1 | 4/2002 | Nelson et al. |
| 6,391,135 | B1 | 5/2002 | Drummond et al. |
| 6,409,078 | B2 | 6/2002 | Varadarajan |
| 6,422,455 | B1 | 7/2002 | Cahill et al. |
| 6,460,759 | B1 | 10/2002 | Lowry et al. |
| 6,540,132 | B1 | 4/2003 | Lowry et al. |
| 6,544,613 | B1 | 4/2003 | Varadarajan |
| 6,558,306 | B2 | 5/2003 | Lowry et al. |
| 6,604,307 | B1 | 8/2003 | Cahill et al. |
| 6,675,971 | B2 | 1/2004 | Case |
| 6,729,486 | B2 | 5/2004 | Hermodsson |
| 6,739,500 | B1 | 5/2004 | Gentile et al. |
| 6,761,675 | B2 | 7/2004 | Drummond et al. |
| 6,829,874 | B2 | 12/2004 | Boatwright et al. |
| 6,857,561 | B2 | 2/2005 | Williams et al. |
| 6,881,286 | B2 | 4/2005 | Drummond et al. |
| 7,055,713 | B2 | 6/2006 | Rea et al. |
| 7,102,518 | B2 | 9/2006 | Bellum et al. |
| 7,112,356 | B2 | 9/2006 | Nomula et al. |
| 7,121,991 | B2 | 10/2006 | Mannlein et al. |
| 7,137,524 | B2 | 11/2006 | Nomula |
| 7,156,252 | B2 | 1/2007 | Morin |
| 7,337,916 | B2 | 3/2008 | Clougherty |
| 7,364,779 | B2 | 4/2008 | Nomula |
| 7,828,197 | B2 | 11/2010 | Schuetz |
| 7,891,516 | B2 | 2/2011 | Takahashi |
| 8,113,416 | B2 | 2/2012 | Yan |
| 8,128,776 | B2 | 3/2012 | Schuetz et al. |
| 8,167,123 | B2 | 5/2012 | Lai |
| 2002/0036228 | A1 | 3/2002 | Reese et al. |
| 2003/0178429 | A1 | 9/2003 | Williams et al. |
| 2004/0074911 | A1 | 4/2004 | Stodd |
| 2004/0118904 | A1 | 6/2004 | Versluys |
| 2004/0121891 | A1 | 6/2004 | Case |
| 2004/0142133 | A1 | 7/2004 | De Coninck et al. |
| 2005/0077298 | A1 | 4/2005 | Nomula |
| 2005/0109784 | A1 | 5/2005 | Varadarajan |
| 2005/0153085 | A1 | 7/2005 | Drummond |
| 2005/0167430 | A1 | 8/2005 | Varadarajan |
| 2005/0223680 | A1 | 10/2005 | Sireix |
| 2005/0252918 | A1 | 11/2005 | McKnight et al. |
| 2005/0252952 | A1 | 11/2005 | Nomula |
| 2005/0279814 | A1 | 12/2005 | Drummond |
| 2006/0057315 | A1 | 3/2006 | De Coninck et al. |
| 2006/0081688 | A1 | 4/2006 | Westphal et al. |
| 2007/0164095 | A1 | 7/2007 | Schuetz |
| 2007/0235512 | A1 | 10/2007 | Drummond |
| 2007/0257044 | A1 | 11/2007 | Stevens |
| 2007/0272693 | A1 | 11/2007 | Richards |
| 2007/0295795 | A1 | 12/2007 | Clougherty |
| 2009/0230140 | A1 | 9/2009 | Weissbrod |
| 2011/0280998 | A1 | 11/2011 | Lorence et al. |
| 2011/0315703 | A1 | 12/2011 | Urushidani et al. |
| 2012/0055981 | A1 | 3/2012 | Parks et al. |
| 2012/0074015 | A1 | 3/2012 | Weissbrod |

FOREIGN PATENT DOCUMENTS

| | | | |
|---|---|---|---|
| DE | 2240611 | | 2/1974 |
| DE | 2717903 | | 3/1978 |
| DE | 2936138 | | 3/1980 |
| DE | 3048037 | | 7/1982 |
| DE | 10021957 | | 11/2001 |
| DE | 10350748 | | 6/2005 |
| DE | 202006002637 | | 4/2006 |
| DE | 202007017347 | | 3/2008 |
| DE | 202008005479 | | 8/2008 |
| EP | 0045274 | | 2/1982 |
| EP | 0108701 | | 5/1984 |
| EP | 0995693 | | 4/2000 |
| EP | 0999143 | | 5/2000 |
| EP | 1103471 | | 5/2001 |
| EP | 1361161 | | 11/2003 |
| EP | 195802 | A2 | 11/2005 |
| FR | 2791037 | | 9/2000 |
| FR | 2842170 | A1 | 1/2004 |
| GB | 1148412 | | 4/1969 |
| GB | 1402799 | | 8/1975 |
| JP | 257542 | | 10/1995 |

(56) References Cited

FOREIGN PATENT DOCUMENTS

| | | |
|---|---|---|
| JP | 9039961 | 2/1997 |
| JP | 9221161 | 8/1997 |
| JP | 10007124 | 1/1998 |
| JP | 10016956 | 1/1998 |
| JP | 11198922 | 7/1999 |
| JP | 11208720 | 8/1999 |
| JP | 2000015659 | 1/2000 |
| JP | 2000062750 | 2/2000 |
| JP | 2000109048 | 4/2000 |
| JP | 2000281041 | 10/2000 |
| JP | 2000326949 | 11/2000 |
| JP | 2001270573 | 10/2001 |
| JP | 2008207814 | 9/2008 |
| TW | 416923 | 1/2001 |
| WO | WO7901113 | 12/1979 |
| WO | WO8501269 | 3/1985 |
| WO | WO0134481 | 5/2001 |

COMPOSITE CONTAINERS FOR STORING PERISHABLE PRODUCTS

TECHNICAL FIELD

The present specification generally relates to composite containers and, more specifically, to composite containers for storing perishable products.

BACKGROUND

Closed containers may be utilized for the storage of perishable products such as, for example, humidity and/or oxygen sensitive solid food products. Such closed containers may be formed from a tubular body having an outwardly rolled top rim and an open bottom end. The open bottom end may be sealed with a bottom made of metal or a composite material. Specifically, the bottom of the tubular body may be sealed by crimping a metal bottom end using seaming techniques such as a double seaming technique. Alternatively, the bottom of the tubular body may be sealed by adhering a composite bottom end to a tubular body.

However, metal bottoms may increase the overall weight of the closed container, which may result in increased energy usage and increased emissions during manufacture of the closed container. Closed containers having composite bottoms are commonly produced using inefficient manufacturing process having less than optimal production rates. Furthermore, closed containers having composite bottoms are prone to manufacturing flaws such as pin holes, pleats, cuts or cracking.

Accordingly, a need exists for alternative composite containers for storing perishable products.

SUMMARY

In one example, a composite container for storing perishable products may include a composite body and a composite bottom. The composite body may be formed into a partial enclosure having an interior surface and an exterior surface. The interior surface and the exterior surface may extend from a bottom end of the composite body to a top end of the composite body and the bottom end of the composite body may terminate at a bottom edge of the composite body. The composite bottom may include a bottom fiber layer, a bottom oxygen bather layer, and a bottom sealant layer, such that the composite bottom has an upper surface and a lower surface. The composite bottom may include a platen portion connected to a sealing portion. A hermetic seal may be formed between the sealing portion of the composite bottom and the interior surface of the composite body. When an internal pressure is applied to the interior surface of the composite body and the upper surface of the platen portion of the composite bottom, an external pressure is applied to the exterior surface of the composite body and the lower surface of the composite bottom, and the internal pressure is about 20 kPa greater than the external pressure, the platen portion of the composite bottom may not extend beyond the bottom edge of the composite body.

In another example, a composite container for storing perishable products may include a composite body and a composite bottom. The composite body may be formed into a partial enclosure having an interior surface and an exterior surface. The interior surface and the exterior surface may extend from a bottom end of the composite body to a top end of the composite body and the bottom end of the composite body may terminate at a bottom edge of the composite body.

The composite bottom may include a platen portion, a radius portion, and a sealing portion. The platen portion may extend to the radius portion and the radius portion may extend to the sealing portion such that the radius portion forms a radius angle between the platen portion and the sealing portion. The composite bottom may include a bottom fiber layer, a bottom oxygen bather layer, and a bottom sealant layer. The composite bottom can have an upper surface and a lower surface. The upper surface of the composite bottom and the lower surface of the composite bottom may terminate at a lower edge of the composite bottom. At least a portion of the composite bottom may be recessed inside the composite body such that the lower edge of the composite bottom is spaced an edge distance away from the bottom edge of the composite body. A hermetic seal may be formed between the sealing portion of the composite bottom and the interior surface of the composite body.

In yet another example, a composite container for storing perishable products may include a composite body, a closure seal and a composite bottom. The composite body may be formed into a partial enclosure having an interior surface and an exterior surface. The interior surface and the exterior surface may extend from a bottom end of the composite body to a top end of the composite body. The composite body may include a body sealant layer that forms at least a portion of the interior surface of the composite body. The closure seal may be hermetically sealed to the body sealant layer at the top end of the composite body. The composite bottom may include a bottom fiber layer, a bottom oxygen barrier layer, and a bottom sealant layer, such that the composite bottom has an upper surface and a lower surface. The bottom sealant layer of the composite bottom may be hermetically sealed to the body sealant layer at the bottom end of the composite body. An internal volume may be enclosed by the interior surface of the composite body, the closure seal, and the upper surface of the composite bottom. A solid food product stored within the internal volume may be shelf stable for 15 months such that a moisture gain of the solid food product is less than 1% per gram of the solid food product.

These and additional features provided by the examples described herein will be more fully understood in view of the following detailed description, in conjunction with the drawings.

BRIEF DESCRIPTION OF THE DRAWINGS

The examples set forth in the drawings are illustrative and exemplary in nature and not intended to limit the subject matter defined by the claims. The following detailed description of the illustrative examples can be understood when read in conjunction with the following drawings, where like structure is indicated with like reference numerals and in which:

DETAILED DESCRIPTION

Figure 1:
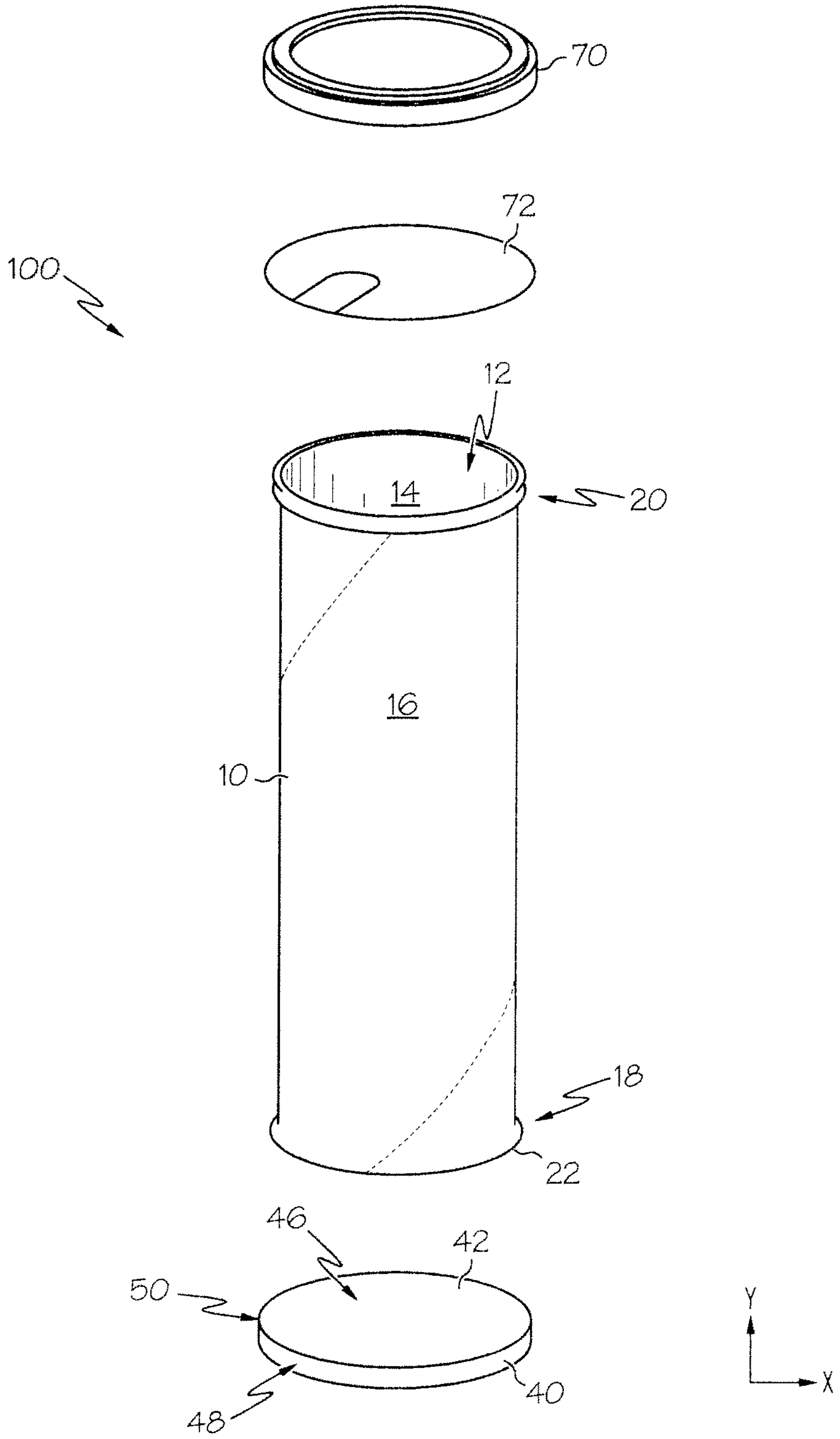
FIG. 1 schematically depicts a composite container according to one or more examples shown and described herein.

The examples described herein relate to high barrier packages for perishable products such as hermetically closed containers for packaging humidity and oxygen sensitive solid food products. The hermetically closed containers described herein may be capable of sustaining a variety of atmospheric conditions. More specifically, the hermetically closed containers may be suitable for maintaining the freshness of crisp food products such as, for example, potato chips, processed potato snacks, nuts, and the like. As used herein, the term "hermetic" refers to the property of sustaining an oxygen ($O_2$) level with a barrier such as, for example, a seal, a surface or a container.

Hermetically closed containers formed according to the examples described herein may include a composite bottom which is shaped and sealed (e.g., via a heated pressing tool) without causing pin holes, pleats, cuts or cracking of the closed container. Thus, when solid crisp food products, which can deteriorate when exposed to humidity or oxygen, are sealed within a hermetically closed container that has a lower probability of having pin holes, pleats, cuts or cracking of the barrier layers, the probability of product deterioration can be reduced. Accordingly, such hermetically closed containers may be capable of enclosing a substantially stable environment (i.e., oxygen, humidity and/or pressure) without bulging and/or leaking.

Furthermore it is noted, that such hermetically closed containers may be transported worldwide via, for example, shipping, air transport or rail. Thus, the containers may be subjected to varying atmospheric conditions (e.g., caused by variations in temperature, variations in humidity, and variations in altitude). For example, such conditions may cause a significant pressure difference between the interior and the exterior of the hermetically closed container. Moreover, the atmospheric conditions may cycle between relatively high and relatively low values, which may exacerbate existing manufacturing defects. Specifically, the hermetically closed container may be subject to strains that lead to defect growth, i.e., the dimensions of for example, pin holes, pleats, cuts or cracks resulting from the manufacturing process may be increased. The hermetically closed containers, described herein, may be transported and/or stored under widely differing climate conditions (i.e., temperature, humidity and/or pressure) without defect growth.

Moreover, in some examples, the hermetically closed container may be formed of material having sufficient rigidity to resist deformation while subjected to varying atmospheric conditions. Specifically, when a hermetically closed container containing a high internal pressure is subjected to ambient conditions at a relatively high altitude (e.g., about 1,524 meters above sea level, about 3,048 meters above sea level, or about 4,572 meters above sea level), the pressure differential between the interior and the exterior of the hermetically closed container may exert a force upon the hermetically closed container (e.g., acting to cause the hermetically closed container to bulge out). Depending upon the shape of the hermetically closed container, any bulging may cause the hermetically closed container to deform, which may lead to unstable behavior on the shelf (e.g., wobbling and rocking) and may negatively influence purchase behavior. In further examples, the hermetically closed containers described herein may be formed from material having sufficient strength, surface friction, and heat stability for rapid manufacturing (i.e., high cycle output machine types and/or manufacturing lines).

The hermetically closed containers described herein may include a metal bottom or a composite bottom. Hermetically closed containers including a metal bottom may be recycled (e.g., in a range of countries, the metal may be separated from the hermetically closed containers prior to being recycled). While, hermetically closed containers including a composite bottom may also be recycled. For example, when the composite bottom is made from similar material as the remainder of the hermetically closed container, the entire container may be recycled without separation. Moreover, such hermetically closed containers may be manufactured according to the methods described herein, which may provide environmental benefits through a reduction in the environmental impact of the container manufacturing process.

FIG. 1 generally depicts one example of a composite container for storing perishable products. The composite container generally comprises a composite body that forms a partial enclosure and a composite bottom for enclosing the composite body. Various examples of the composite container and methods for forming the composite container will be described in more detail herein.

Referring still to FIG. 1, a composite container 100 may comprise a composite body 10 that forms a partial enclosure 12 having an interior surface 14 and an exterior surface 16, which may be utilized to contain a perishable product. The composite body 10 may be elongate such that the interior surface 14 and the exterior surface 16 extend from a bottom end 18 of the composite body 10 to a top end 20 of the composite body 10. The bottom end 18 of the composite body 10 may terminate at a bottom edge 22 of the composite body 10. The bottom edge 22 of the composite body 10 may be outwardly flanged (as depicted in FIG. 1), or the bottom edge 22 may have a substantially similar cross section as the composite body 10 (as depicted in FIGS. 5-8). In some examples, the top end 20 of the composite body 10 may be shaped to receive a top closure 70 (e.g., the top end 20 may include an outwardly rolled rim).

The composite body 10 may be any shape suitable for storing a perishable product, for example, tube shaped. It is noted that, while the composite body 10 is depicted as having a substantially cylindrical shape with a substantially circular cross-section, the composite body 10 may have any cross-section suitable to contain a perishable product such as, for example, the cross-sectional shape of the composite body may be substantially triangular, quadrangular, pentagonal, hexagonal or elliptical. Furthermore, the composite body 10 may be formed by any forming process capable of generating the desired shape such as, for example, spiral winding or longitudinal winding.

Figure 2:
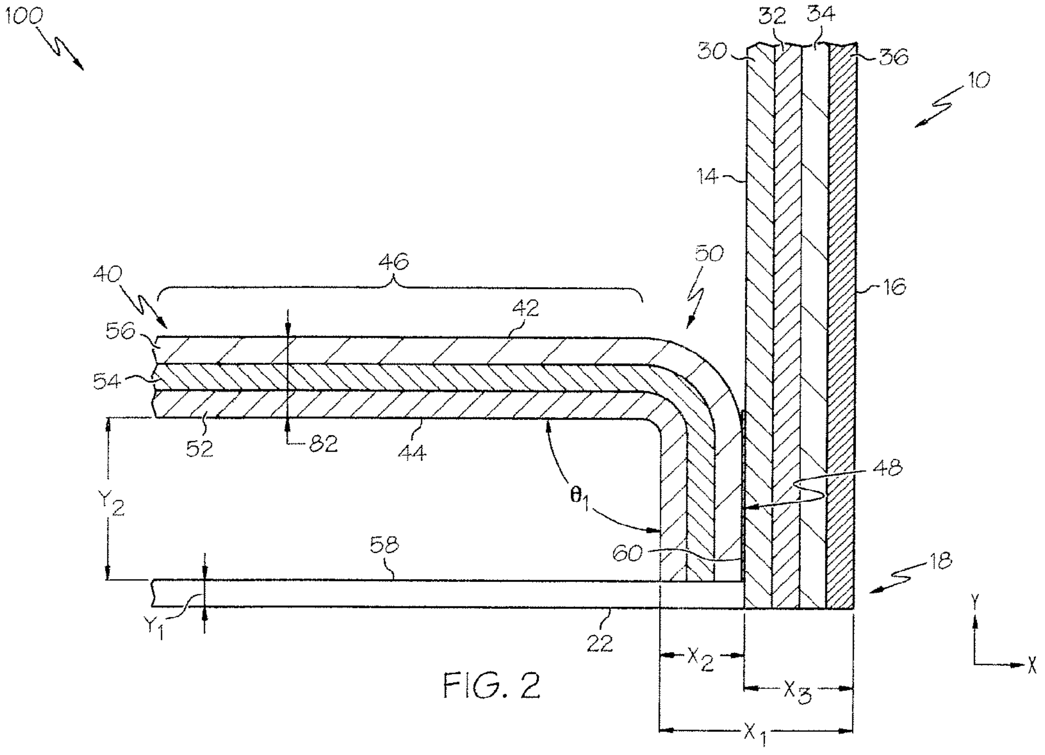
FIG. 2 schematically depicts a composite container according to one or more examples shown and described herein.

Referring now to FIG. 2, the composite body 10 may comprise a plurality of layers that are delineated by the interior surface 14 of the composite body 10 and the exterior surface 16 of the composite body 10. In one example, the composite body can comprise a body sealant layer 30, a body oxygen barrier layer 32, a body fiber layer 34, and an outer coating 36, which can be printed to provide information as to the contents of the container. The body sealant layer 30 may form at least a portion of the interior surface 14 of the composite body 10. The body sealant layer 30 may be adjacent to the body oxygen bather layer 32. The body oxygen barrier layer 32 may be adjacent to the body fiber layer 34. The body fiber layer 34 may be adjacent to the outer coating 36. Accordingly, in one example, moving outwards from the interior surface 14 to the exterior surface 16 (depicted as the positive X-direction in FIG. 2), the composite body 10 may be formed by a composite having the following layers: body sealant layer 30, a body oxygen barrier layer 32, a body fiber layer 34, and an outer coating 36. Each of the layers described herein may be coupled to any adjacent layer with or without an adhesive. Suitable adhesives may comprise a polyethylene resin, preferably a low density polyethylene resin, a modified polyethylene resin containing vinyl acetate, acrylate and/or methacrylate monomers and/or an ethylene based copolymer having grafted functional groups.

Referring back to FIG. 1, the composite container 100 may comprise a composite bottom 40 for sealing an end of the composite body 10. The composite bottom 40 may comprise a platen portion 46, a sealing portion 48, and a radius portion 50. Generally, the platen portion 46 may form a lower boundary for the composite container 100 that defines a volume available to enclose a perishable product. The sealing portion 48 of the composite bottom 40 may be utilized to couple the composite bottom 40 to the composite body 10. The platen portion 46 may be connected to the sealing portion 48 by the radius portion 50 of the composite bottom 40. In the example depicted in FIG. 1, the radius portion 50 is depicted as a circumferential bend in the composite bottom 40. However, the radius portion 50 may be a bend having any shape along the perimeter of the composite bottom 40 that is suitable for coupling with a corresponding container.

In the example depicted in FIG. 2, the composite bottom 40 may further comprise an upper surface 42 and a lower surface 44. The upper surface 42 of the composite bottom 40 and the lower surface 44 of the composite bottom 40 may terminate at a lower edge 58 of the composite bottom 40. For example, when the composite bottom 40 is formed into a cup shape, the lower edge 58 may be the surface running along the X-direction and having the lowest Y value that is located between the upper surface 42 and the lower surface 44 of the composite bottom 40.

Furthermore, as depicted in FIG. 2, the platen portion 46 of the composite bottom 40 may extend to the radius portion 50, which may extend to the sealing portion 48. The radius portion 50 may form a radius angle $\theta_1$ between the platen portion 46 and the sealing portion 48, which is measured from the lower surface 44 of the composite bottom. It is noted that, while the a radius angle $\theta_1$ is depicted in FIG. 2 as being equal to about 1.6 radians, the radius angle $\theta_1$ may be any angle such as, for example, an angle from about 1.15 radians to about 2.15 radians, an angle from about 1.3 radians to about 2 radians, or an angle from about 1.45 radians to about 1.75 radians. Furthermore, it is noted that, while the platen portion 46 is depicted in FIG. 2 as being substantially flat, the platen portion 46 may be bowed up or bowed down.

The composite bottom 40 may comprise a plurality of layers that are delineated by the upper surface 42 of the composite bottom 40 and the lower surface 44 of the composite bottom 40. In one example, the composite bottom 40 may comprise a bottom fiber layer 52, a bottom oxygen barrier layer 54, and a bottom sealant layer 56. The bottom fiber layer 52 may form at least a portion of the lower surface 44 of the composite bottom 40. The bottom sealant layer 56 may form at least a portion of upper surface 42 of the composite bottom 40. The bottom oxygen barrier layer 54 may be disposed between the bottom fiber layer 52 and the bottom sealant layer 56. Each of the bottom fiber layer 52, the bottom oxygen bather layer 54, and the bottom sealant layer 56 may be coupled to one another directly or via an adhesive. Optionally, an additional coating may be applied to the outside of the bottom fiber layer 52, which may include printing, coating, or lacquer resistant to discoloration and dislocation under the heat sealing conditions. Accordingly, the composite bottom 40 may have a density of less than about 2.5 g/m$^3$ such as less than about 1.5 g/m$^3$ or less than about 1.0 g/m$^3$. Moreover, the composite bottom 40 may have a modulus of elasticity of less than about 35 GPa such as less than about 30 GPa or less than about 10 GPa.

The body sealant layer 30 and/or the bottom sealant layer 56 may comprise a thermoplastic material suitable for forming a heat seal. The thermoplastic material may be heat-sealable from about 90° C. to about 200° C. such as from about 120° C. to about 170° C. Moreover, the thermoplastic material may have a thermal conductivity from 0.3 W/(mK) to about 0.6 W/(mK) such as from about 0.4 W/(mK) to about 0.5 W/(mK). The thermoplastic material may comprise, for example, an ionomer-type resin, or be selected from the group comprising salts, preferably sodium or zinc salts, of ethylene/methacrylic acid copolymers, ethylene/acrylic acid copolymers, ethylene/vinyl acetate copolymers, ethylene/methylacrylate copolymers, ethylene based graft copolymers and blends thereof. In addition, for example, a polyolefin. Exemplary and non-limiting compounds and polyolefins that can be used as thermoplastic material may include polycarbonate, linear low-density polyethylene, low-density polyethylene, high-density polyethylene, polyethylene terephthalate, polypropylene, polystyrene, polyvinyl chloride, co-polymers thereof, and combinations thereof.

The body oxygen barrier layer 32 and/or the bottom oxygen bather layer 54 may comprise an oxygen inhibiting material. The oxygen inhibiting material may be a metallized film comprising, for example, aluminum. In further examples, oxygen inhibiting material may comprise an aluminum foil. The body oxygen bather layer 32 may have a thickness ranging from about 6 μm to about 15 μm such as from about 9 μm to about 15 μm, from about 6 μm to about 12 μm, or from about 7 μm to about 9 μm. The bottom oxygen bather layer 54 may have a thickness ranging from about 6 μm to about 15 μm such as from about 9 μm to about 15 μm, from about 6 μm to about 12 μm, or from about 7 μm to about 9 μm. Accordingly, the body oxygen bather layer 32 and the bottom oxygen barrier layer 54 may each have a thermal conductivity from about 200 W/(mK) to about 300 W/(mK) such as from about 225 W/(mK) to about 275 W/(mK).

The body fiber layer 34 and/or the bottom fiber layer 52 may comprise a fiber material such as, for example, cardboard or litho paper. The fiber material can comprise a single layer or multiple layers joined by means of one or more adhesive layers. The fiber material can have a thermal conductivity from about 0.04 W/(mK) to about 0.3 W/(mK) such as 0.1 W/(mK) to about 0.25 W/(mK) or about 0.18 W/(mK). The body fiber layer 34 may have a total area weight from about 200 g/m$^2$ to about 600 g/m$^2$ such as from about 360 g/m$^2$ to about 480 g/m$^2$. The bottom fiber layer 52 may have a total area weight from about 130 g/m$^2$ to about 450 g/m$^2$ such as from about 150 g/m$^2$ to about 250 g/m$^2$, or about 170 g/m$^2$.

Referring back to FIG. 1, the partial enclosure 12 of the composite container 100 may be hermetically sealed with a closure seal 72 and a composite bottom 40. Specifically, the closure seal 72 may be hermetically sealed to the top end 20 of the composite body 10 such that the closure seal 72 conforms radially and circumferentially with the top end 20 of the composite body. The closure seal 72 may comprise a thin membrane having one or more layers of paper, oxygen inhibiting material and thermoplastic material. Adhesive may be provided between the paper, oxygen inhibiting material and/or thermoplastic material. In one example, the oxygen inhibiting material may be an aluminized coating having a thickness of about 0.5 μm disposed on a carrier layer comprising polyester such as polyethylene terephthalate in homopolymer or copolymer variation or combinations thereof, or such a carrier layer consisting of an oriented polypropylene. The closure seal 72 may be shaped to facilitate removal from the composite container 100, i.e., may be shaped to include an integral pull-tab for removal from the top end 20 of the composite body 10. In some examples, the top closure 70 is configured for removal and reattachment to the composite body 10 before and after the closure seal 72 is removed. For example, a consumer may access the contents of the composite container 100 by removing the top closure 70 and the closure seal 72 from the top end 20 of the composite body 10. The top end 20 of the composite body may later be closed by reattaching the top closure 70 to the top end 20 (e.g., via engagement with a rolled top).

Figure 7:
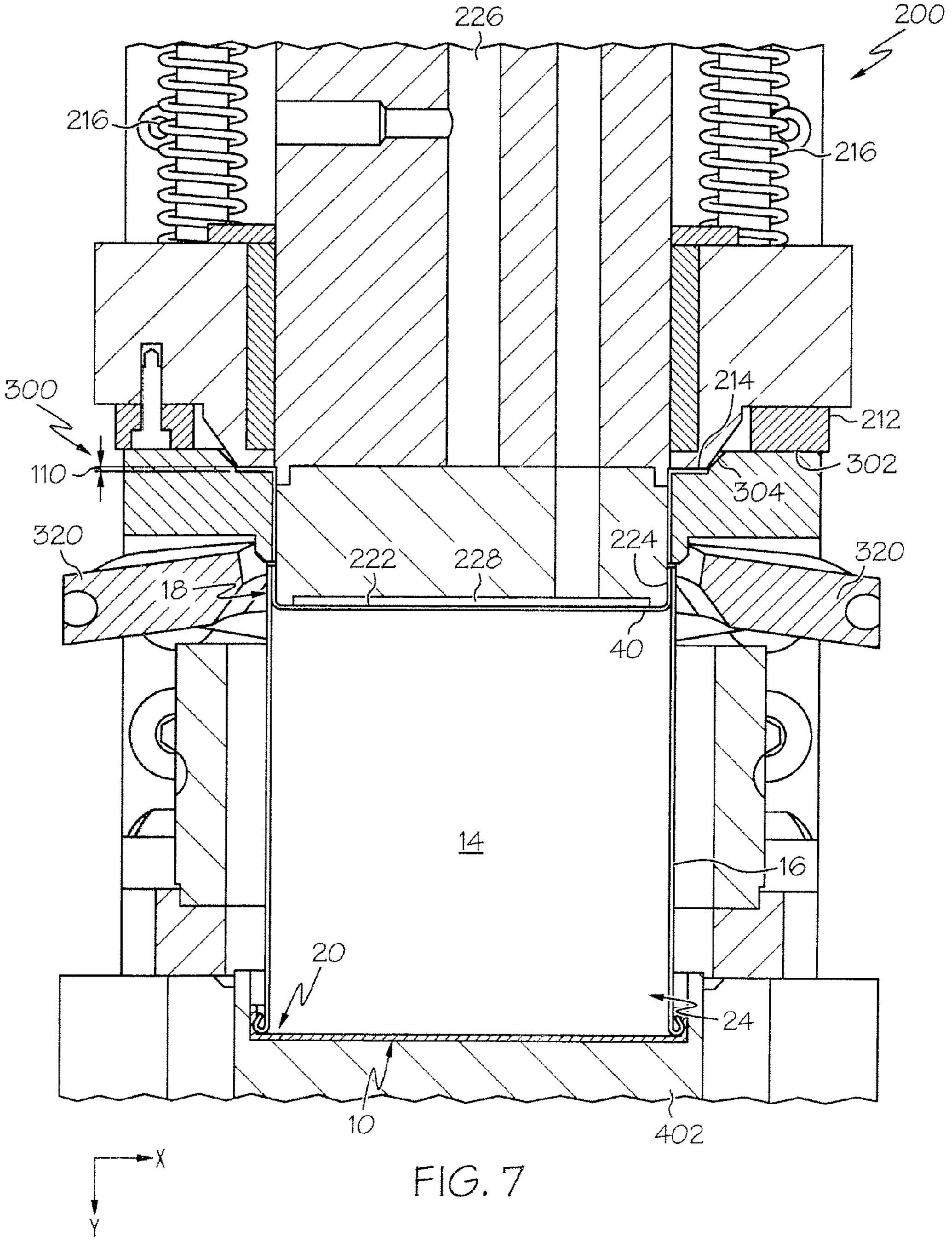
Figure 8:
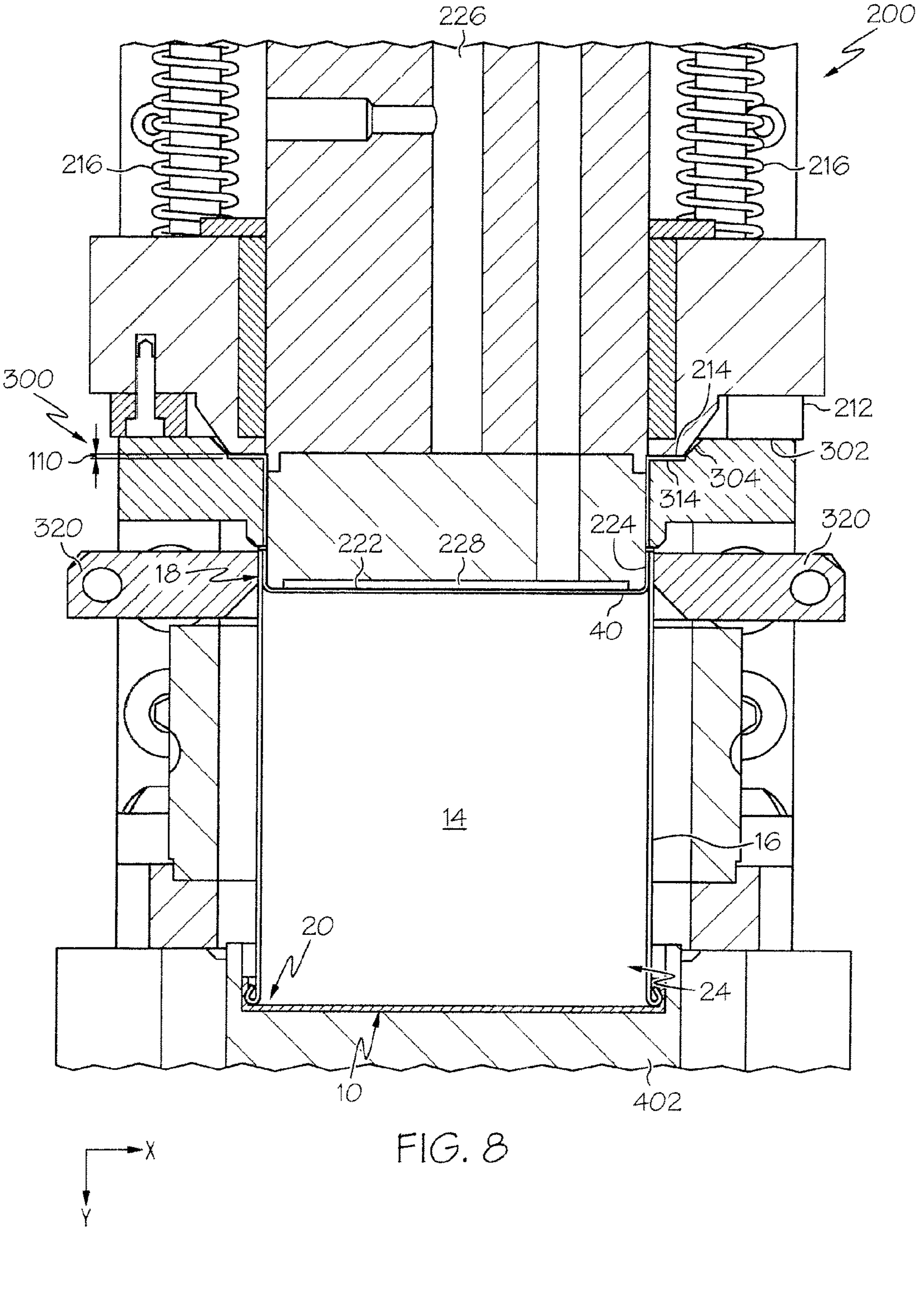

In some examples, the composite body 10 and the closure seal 72 may be hermetically sealed prior to filling the composite container 100 with a perishable product. Specifically, the closure seal 72 and the composite container 100 may be prefabricated and hermetically sealed to one another. The container may be filled with a perishable product from the open end of the container, i.e, the bottom end 18. Once filled, the composite container may be closed hermetically by hermetically sealing the composite bottom 40 to the bottom end 18 of the composite body 10 and enclosing an internal volume 24 (FIGS. 7 and 8).

Referring again to FIG. 2, the composite bottom 40 may be recessed inside the composite body 10 such that the platen portion 46 measured from the lower surface 44 of the composite bottom 40 is spaced away from the bottom edge 22 of the composite body 10. Specifically, the platen portion 46 may be recessed (depicted as the sum of $Y_1$ and $Y_2$ in FIG. 2) from about 2 mm to about 40 mm such as for example about 5 mm to about 30 mm, about 6 mm to about 13 mm, or about 10 mm. In another example, the composite bottom 40 may be recessed inside the composite body 10 such that the lower edge 58 of the composite bottom 40 is spaced an edge distance $Y_1$ away from the bottom edge 22 of the composite body 10. It is noted that, while the lower edge 58 of the composite bottom 40 is depicted as being recessed into the composite bottom 10, in some examples the lower edge 58 of the composite bottom 40 may protrude below the bottom edge 22 of the composite body 10, i.e., the lower edge 58 of the composite bottom 40 may have a lower Y-axis value than the bottom edge 22 of the composite body 10. Accordingly, the edge distance $Y_1$ may be a positive or a negative distance along the Y-axis. A suitable edge distance $Y_1$ may be within about 10 mm away from the bottom edge 22 of the composite body 10 such as, for example, within about 13 mm, within about 6 mm, within about 2 mm, or from about 0 mm to about 1 mm away from the bottom edge 22 of the composite body 10.

As is noted above, a hermetic seal 60 may be formed between the sealing portion 48 of the composite bottom 40 and the interior surface 14 of the composite body 10. The hermetic seal 60 may have a leakage rate equivalent to a hole diameter of less than about 300 μm such as, for example, less than about 75 μm, less than about 25 μm or less than about 15 μm, when measured by the vacuum decay method as described by ASTM test method F2338. The vacuum decay method may be utilized to determine the equivalent hole diameter of the hermetic seal 60 directly, i.e., by coating the non-sealed portions of the composite container 100 with a substance that inhibits leakage. The vacuum decay method may be utilized to derive the equivalent hole diameter of the hermetic seal 60 from multiple measurements. The vacuum decay method may also be utilized to determine the upper bounds of the equivalent hole diameter of the hermetic seal 60 by measuring the leakage of the composite container 100, i.e., the equivalent hole diameter of the hermetic seal 60 may be assumed to be less than or equal to the equivalent hole diameter of a composite container 100 that includes the hermetic seal 60.

The thickness $X_1$ of the hermetic seal 60 can be measured from the exterior surface 16 of the composite body 10 to the lower surface 44 of the composite bottom 40. The thickness $X_1$ of the hermetic seal 60 may be any distance suitable to maintain the hermeticity of the hermetic seal 60 seal and the structural integrity of the composite container 100. The thickness $X_1$ may be from about 0.0635 cm to about 0.16 cm or any distance less than about 0.16 cm such as from about 0.0635 cm to about 0.1092 cm. Furthermore, the thickness $X_2$ of the composite bottom 40 measured between the upper surface 42 and the lower surface 44 may be from about 0.011 cm to about 0.06 cm and the thickness $X_3$ of the composite body 10 measured between the interior surface 14 and the exterior surface 16 may be from about 0.05 cm to about 0.11 cm.

Figure 9:
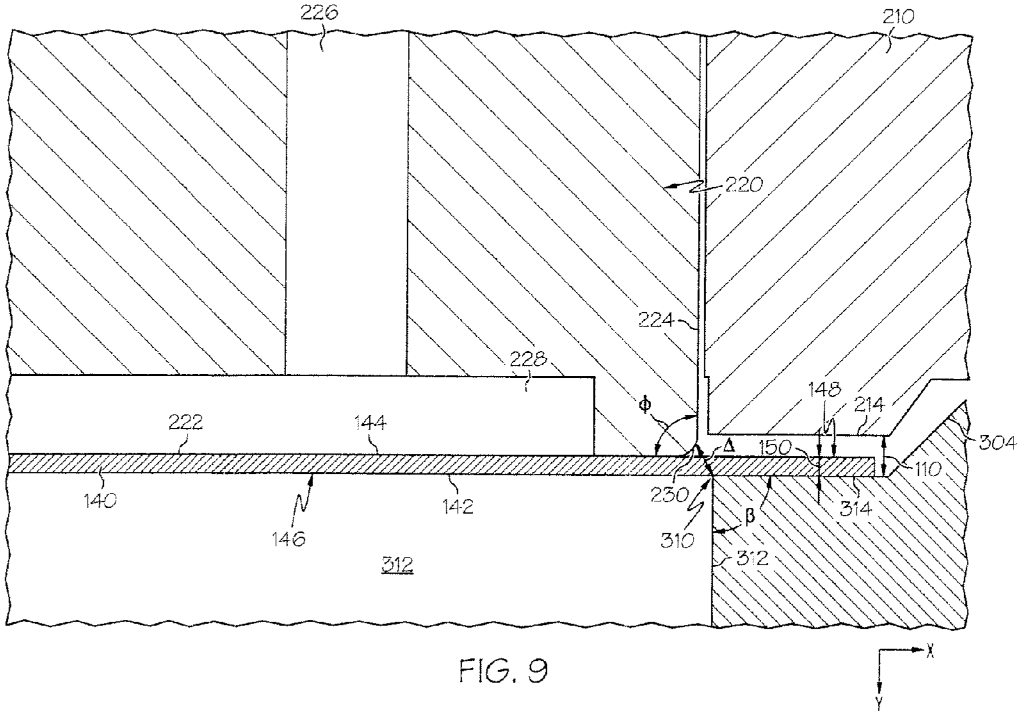

Referring collectively to FIGS. 1 and 2, the composite container 100 may include a closure seal 72 hermetically sealed to the top end 20 of the composite body 10 and a composite bottom 40 hermetically sealed to the bottom end 18 of the composite body 10. Thus, the composite container 100 may be hermetic and enclose a solid food product within an internal volume 24 (FIGS. 8 and 9). When so enclosed, the solid food product may be shelf stable for a period of time such as about 15 months, about 12 months, about 10 months or about 3 months. The solid food product is considered shelf stable when the moisture gain of the solid food product is less than 1% per gram of the solid food product. In some embodiments, the composite container 100 may have a water vapor transmission rate less than about 0.1725 grams per $m^2$ per day such as, for example, less than about 0.0575 grams per $m^2$ per day or less than about 0.0345 grams per $m^2$ per day when subjected to ambient conditions of air at 26.7° C. and 80% relative humidity. The water vapor transmission rate may be determined by weighing the container to determine a baseline weight. The container may then be subjected to ambient conditions of air at 26.7° C. and 80% relative humidity and weighed periodically after 24 hours. The container may be repeatedly subjected to ambient conditions of air at 26.7° C. and 80% relative humidity throughout a weight gain period until the weight gain over a 24 hour period is less than about 0.5 grams. After the weight gain period, the water vapor transmission rate for the entire container may be determined according to ASTM test method D7709 using 26.7° C. and 80% relative humidity as the testing conditions. The water vapor transmission rate for the entire container can be scaled by the total internal surface area of the container in units of square meters to determine the water vapor transmission rate transmission rate in grams per $m^2$ per day.

The composite container 100 is hermetic when the oxygen transmission rate of the composite container 100 is less than about 50 $cm^3$ of $O_2$ per $m^2$ of the interior surface area of the composite container 100 per day such as, for example, less than about 25 $cm^3$ of $O_2$ per $m^2$ per day or less than about 14.32 $cm^3$ of $O_2$ per $m^2$ per day, as measured by ASTM test method F1307 when subjected to ambient conditions of air at 22.7° C. and 50% relative humidity. The interior surface area of the composite container 100 includes the interior surface 14 of the composite container 100 and the upper surface 42 of the composite bottom 40. The interior surface area of the composite container 100 may also include any top closure.

As is noted above, the composite container 100 may be subjected to a pressure differential between the interior and the exterior of the composite container 100 that acts to cause the composite container 100 to bulge out. Examples of the composite container 100 may be structurally resistant to bulging when measured by a pressure differential method as described by ASTM test method D6653. In one example, the platen portion 46 of the composite bottom 40 may not extend beyond the bottom edge 22 of the composite body 10 when: an internal pressure is applied to the interior surface 14 of the composite body 10 and the upper surface 42 of the platen portion 46 of the composite bottom 46; an external pressure is applied to the exterior surface 16 of the composite body 10 and the lower surface 44 of the composite bottom 40; and the internal pressure is about 20 kPa or more (e.g., about 30 kPa, about 35 kPa, or about 38 kPa) greater than the external pressure. In another example, the composite bottom 40 may not extend beyond the bottom edge 22 of the composite body 10 when: an internal pressure is applied to the interior surface 14 of the composite body 10 and the upper surface 42 of the composite bottom 40; an external pressure is applied to the exterior surface 16 of the composite body 10 and the lower surface 44 of the composite bottom 40; and the internal pressure is about 20 kPa or more (e.g., about 30 kPa, about 35 kPa, or about 38 kPa) greater than the external pressure.

Such pressure differentials can be applied as described by ASTM test method D6653. Any suitable chamber capable of withstanding about one atmosphere pressure differential fitted with a flat-vacuum-tight cover or equivalent chamber providing the same functional capabilities can be utilized. Moreover, it may be desirable to utilize a vacuum chamber that provides visual access to observe test samples. When the desired pressure differential is applied to a composite container 100 supported at the bottom end 18, the composite bottom 100 can be visually inspected. For example, when the platen portion 46 of the composite bottom 40 extends beyond the bottom edge 22 of the composite body 10 tilting, slanting and/or rocking can be observed.

A composite container 100 including a composite bottom 40 hermetically sealed to the bottom end 18 of the composite body 10 can be subjected to implosion testing. Implosion testing is analogous to ASTM D6653 where a pressure differential between the interior and the exterior of the composite container 100 is applied. Rather than subjecting the composite container 100 to a surrounding vacuum environment, implosion testing pulls a vacuum within the composite container 100. Any vacuum device suitable for measuring the vacuum resistance strength of a container in units of pressure (e.g., in-Hg) can be utilized for implosion testing. One suitable vacuum device is the VacTest VT1100, available from AGR TopWave of Butler, Pa., U.S.A.

The implosion test can be applied by securing the top end 20 of a composite container 100 to the vacuum device (e.g., forming a continuous seal with a rubber coated test cone and/or with a plug having a hose for pulling a vacuum). Successive test cycles can be applied to the composite container 100 at ambient conditions of air at about 22° C. and about 50% relative humidity. Each successive cycle may increment the amount of vacuum pressure applied to the composite container 100. When the composite container 100 implodes, the peak vacuum pressure applied during the test cycle can be indicative of the implosion strength of the composite container 100. Implosion testing can be applied to composite containers 100 from about 30 minutes to about 1 hour after manufacture (i.e., "green cans") and/or greater than about 24 hours after manufacture (i.e., "cured cans"). Composite containers 100 having a substantially cylindrical shape may have an implosion strength of greater than about 3 in-Hg (10.2 kPa) such as for example, greater than about 5 in-Hg (16.9 kPa) or greater than about 7 in-Hg (23.7 kPa).

It is noted that the implosion strengths described above were determined using a composite container 100 having a diameter of about 3 in (about 7.6 cm) and a height of about 10.5 in (about 26.7 cm). The implosion strengths can be scaled to containers having other dimensions and/or shapes. Specifically, a decrease in height results in an increase in implosion strength and an increase in height results in a decrease in implosion strength. A decrease in diameter results in an increase in implosion strength and an increase in diameter results in a decrease in implosion strength. The loading of the container is analogous to a beam in beam theory, with the length of the composite container 100 correlated to the length of a beam and the diameter length of the composite container 100 correlated to the area moment of inertia of a beam. Accordingly, the implosion strengths described herein may be scaled to different dimensions based upon beam theory.

Figure 3:
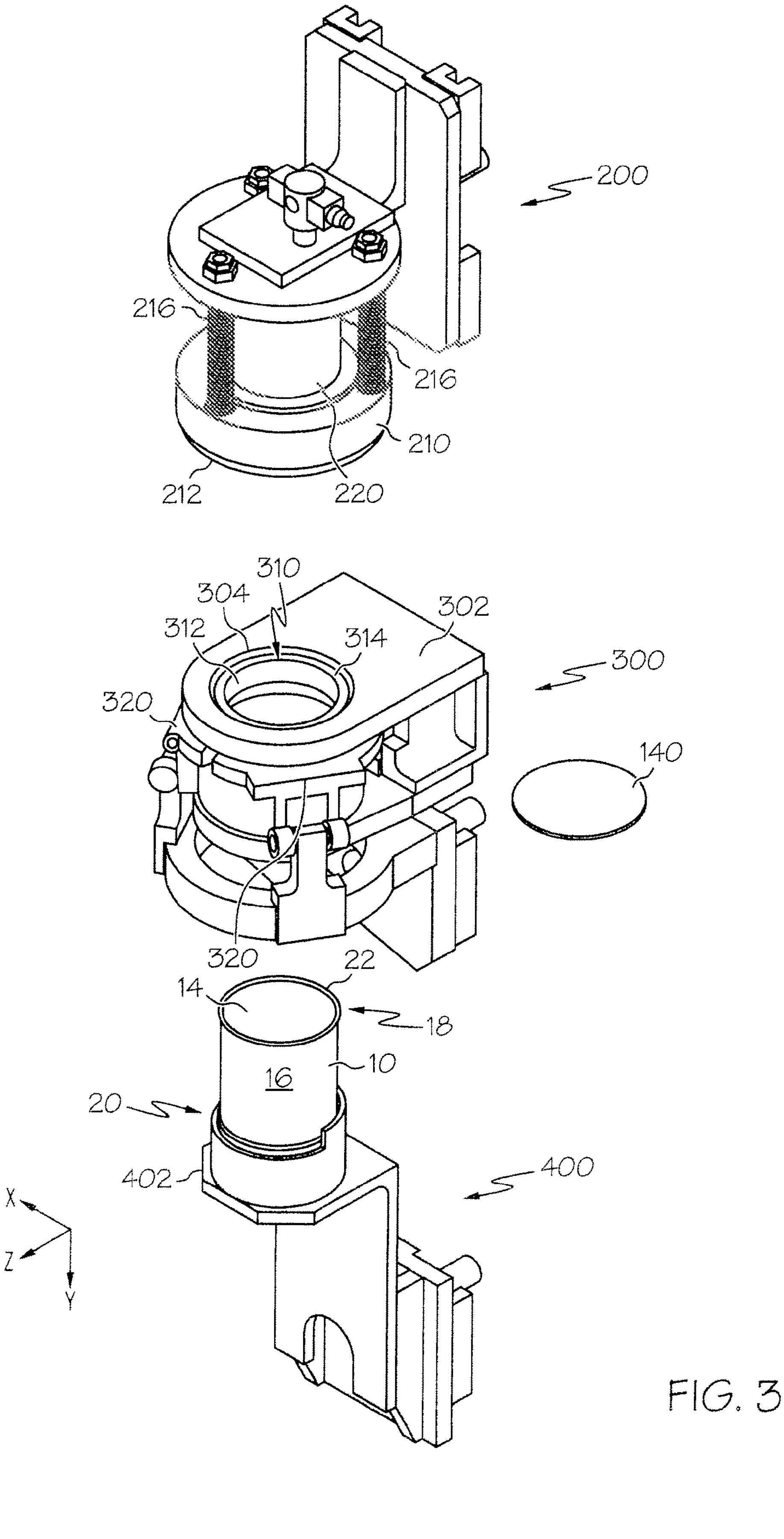
FIG. 3 schematically depicts an assembly for forming a composite container according to one or more examples shown and described herein.
Figure 4:
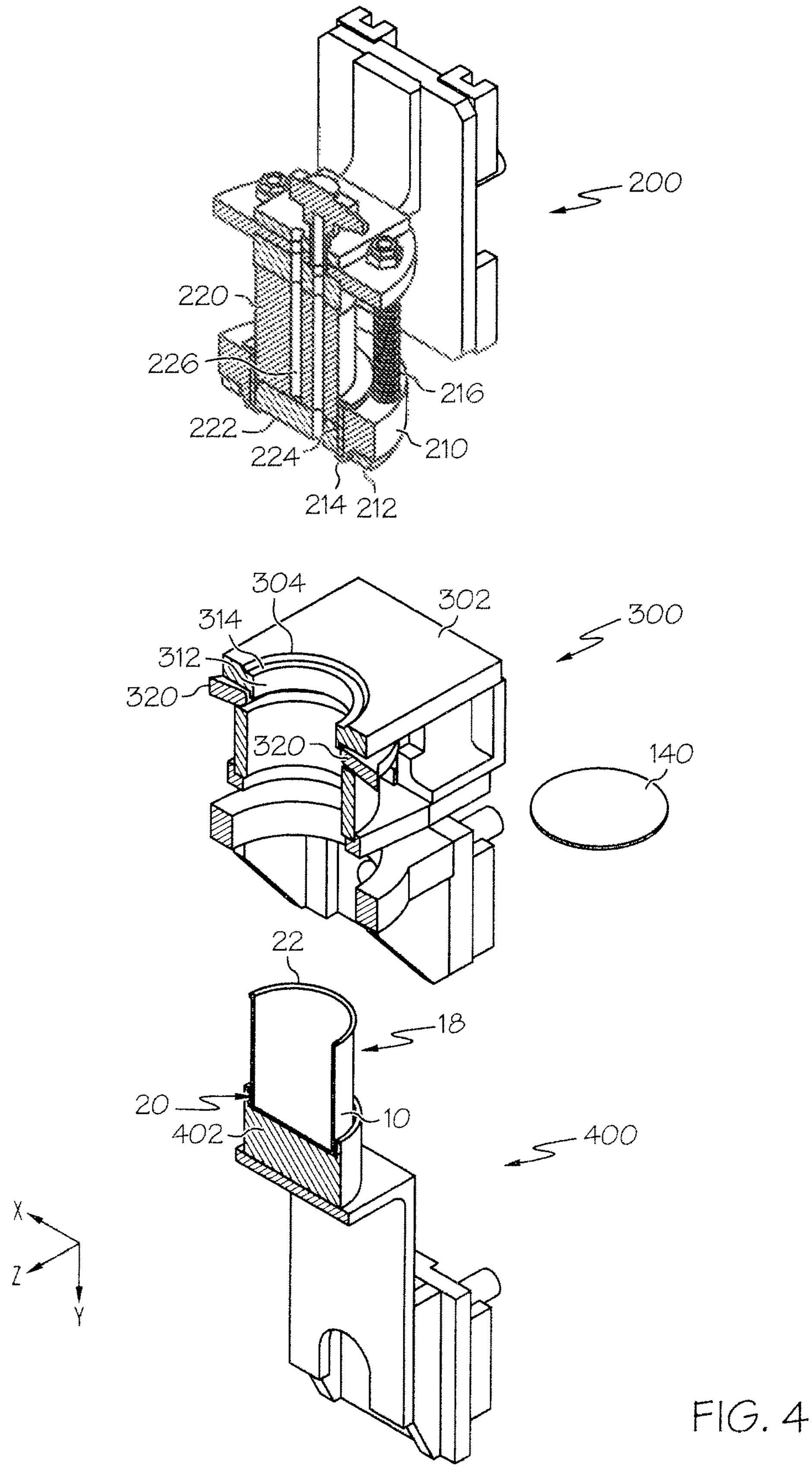
FIG. 4 schematically depicts an assembly for forming a composite container according to one or more examples shown and described herein.
Figure 5:
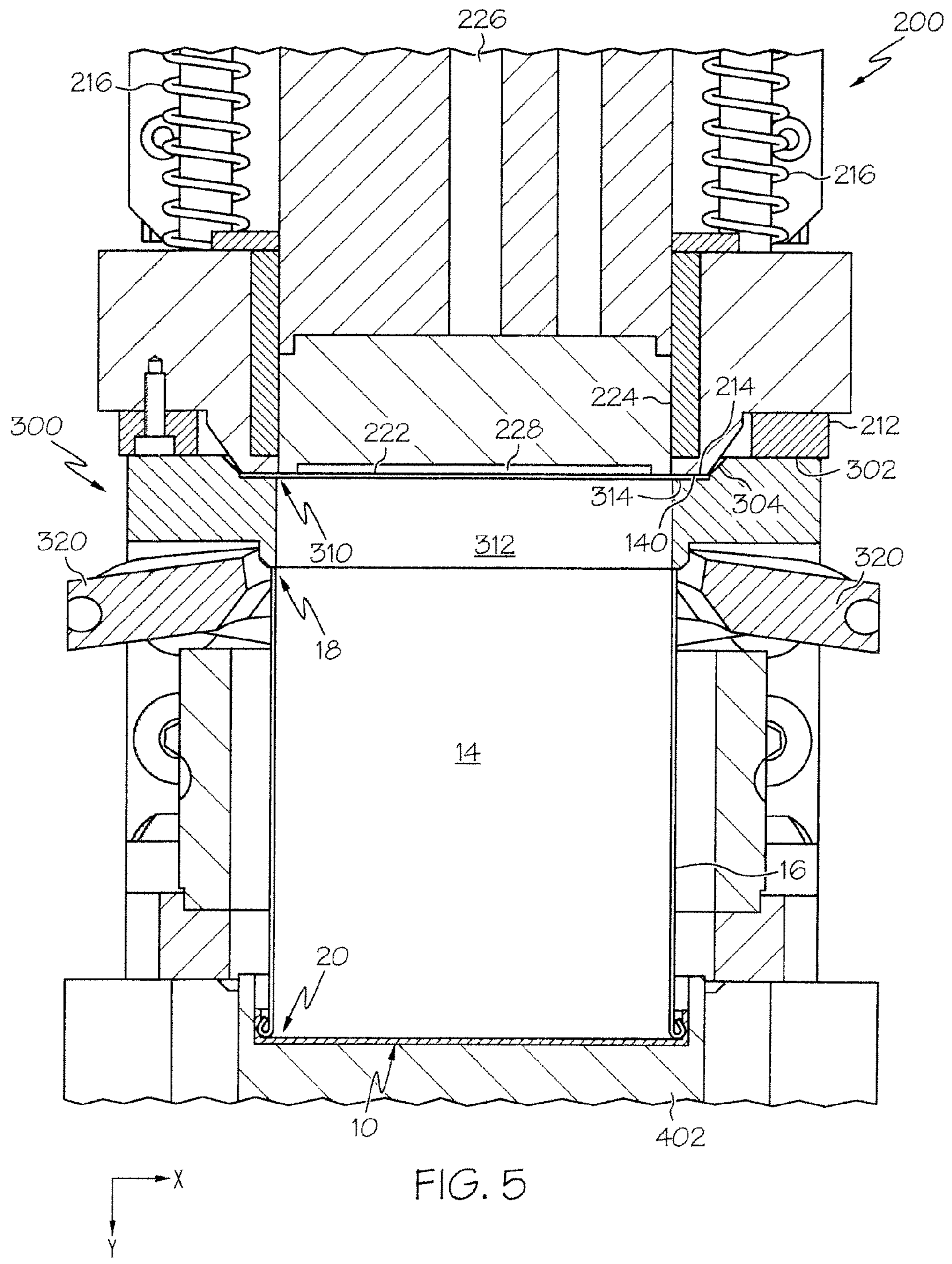
FIGS. 5-11 schematically depict a method for forming a composite container according to one or more examples shown and described herein.
Figure 6:
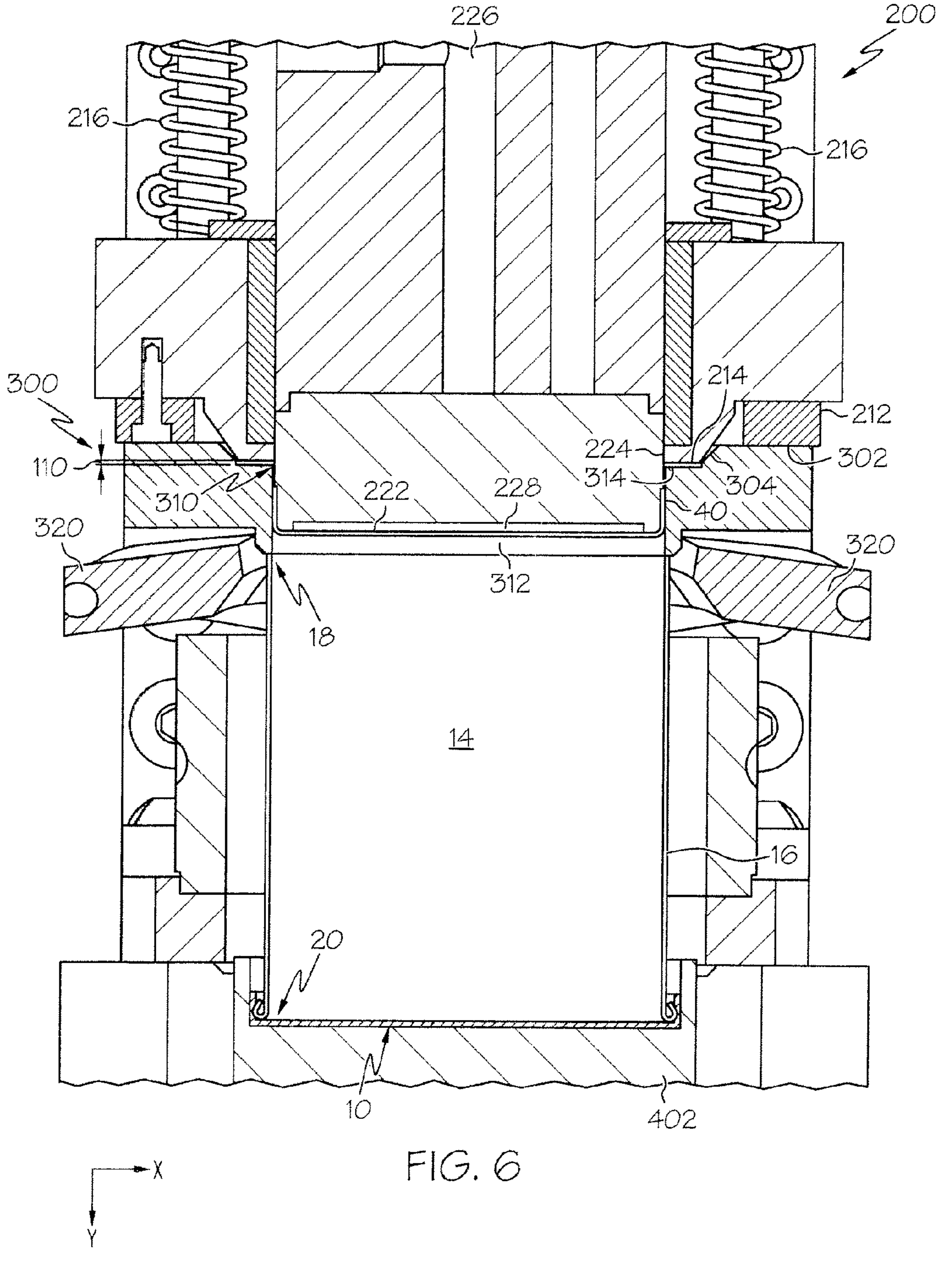

Referring collectively to FIGS. 3 and 4, the examples described herein may be formed according to the methods described herein. In one example, a composite sheet 140 may be shaped to conform with a composite body 10 by a mandrel assembly 200, a die assembly 300 and a tube support assembly 400 operating in cooperation. The mandrel assembly 200 may be utilized to stamp or press a composite sheet 140 into a composite bottom 40. The mandrel assembly 200 may include an outer mandrel 210 and an inner mandrel 220, which may move along the Y-axis independent of one another. The outer mandrel 210 may be movably coupled to the mandrel assembly 200 by springs 216. The outer mandrel 210 may comprise a gap gauge 212 configured to control the spacing of the outer mandrel 210 and a first forming surface 214 configured to shape a work piece such as a composite sheet 140. For example, a composite sheet 140 constrained by the first forming surface 214 may be formed into a composite bottom 40 having fewer pleats than a composite bottom 40 formed from a composite sheet that is not constrained by the first forming surface 214.

Figure 10:
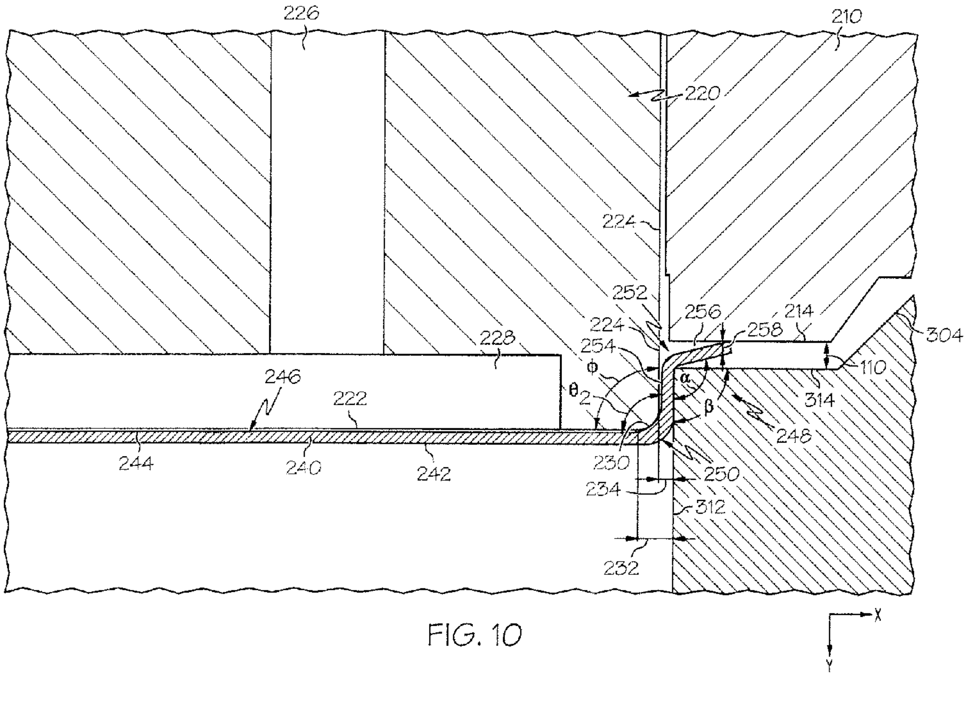
Figure 11:
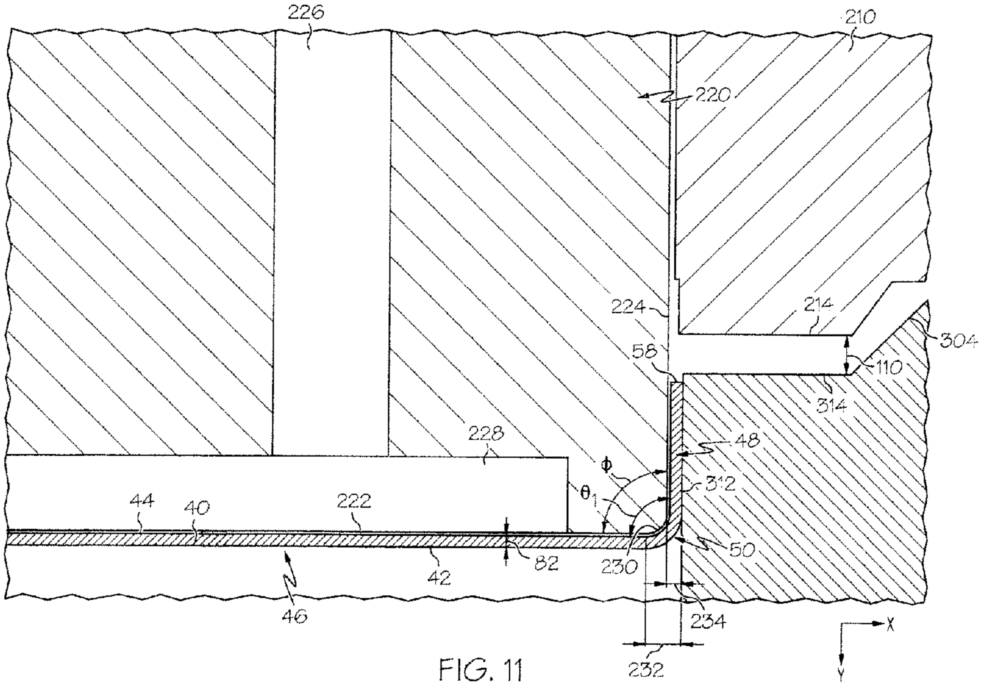

Referring collectively to FIGS. 4-11, the inner mandrel 220 may translate with respect to the outer mandrel 210 to shape a work piece. In one example, the inner mandrel 220 may be fixedly coupled to the mandrel assembly 200. The inner mandrel 220 may comprise a first mandrel surface 222 adjacent to a second mandrel surface 224 configured to shape a work piece such as a composite sheet 140. Furthermore, it is noted that, while the first mandrel surface 222 and the second mandrel surface 224 are depicted in FIGS. 4-11 as being substantially flat, the first mandrel surface 222 and the second mandrel surface 224 may be curved, contoured or shaped. As is depicted in FIGS. 9-11, the first mandrel surface 222 and the second mandrel surface 224 may be aligned to one another at a forming angle $\Phi$. The forming angle $\Phi$ measured between the first mandrel surface 222 and the second mandrel surface 224 may be from about 1.31 radians to about 1.83 radians such as, for example, from about 1.48 radians to about 1.66 radians or about 1.57 radians. The inner mandrel 220 may further comprise a shaped portion 230 that is disposed between the first mandrel surface 222 and the second mandrel surface 224. The shaped portion 230 may be curved, chamfered, or comprise any other contour configured to mitigate the introduction of manufacturing defects to a work piece. It is noted that, while the inner mandrel 220 is depicted as having a substantially circular cross-section, the inner mandrel 220 may have a cross-section that is substantially circular, triangular, rectangular, quadrangular, pentagonal, hexagonal or elliptical.

A mandrel heater 226 may be configured to conductively heat the first mandrel surface 222 and the second mandrel surface 224 of the inner mandrel 220. Specifically, the mandrel heater 226 may be disposed within the inner mandrel 220. The inner mandrel 220 may further comprise an insulated portion 228 formed from a heat insulating material that is configured to mitigate heat transfer. Specifically, the first mandrel surface 222 may be partially formed by an insulated portion 228 that is recessed within the inner mandrel 220 such that the shaped portion 230 and the second mandrel surface 224 is preferentially heated.

Referring back to FIGS. 3 and 4, the die assembly 300 may cooperate with the mandrel assembly 200 to shape a composite sheet 140 into a shape suitable for insertion into the bottom end 18 of a composite body 10. The die assembly 300 may comprise a gauge support surface 302, a locating portion 304, a die opening 310 and sealing members 320. As depicted in FIGS. 5-11, the gauge support surface 302 may cooperate with the gap gauge 212 of the outer mandrel 210 to control the spacing between mandrel assembly 200 and the die assembly 300. In one example, the die assembly 300 may only contact a specific portion of the outer mandrel 210 to control spacing, i.e., the gauge support surface 302 may contact the gap gauge 212. Specifically, as is depicted in FIGS. 9-11, the aforementioned interaction may control the gap distance 110 measured between the first forming surface 214 of the outer mandrel 210 and the second forming surface 314 of the die assembly 300.

Referring back to FIGS. 3 and 4, the locating portion 304 of the die assembly 300 may be configured to accept and align a composite sheet 140 prior to forming. The locating portion 304 may be disposed adjacent to the die opening 310 in order to align a composite sheet 140 with the die opening 310. For example, as depicted in FIGS. 9-11, the locating portion 304 may be a sloped feature that connects the gauge support surface 302 to the second forming surface 314. The locating portion 304 may have a larger perimeter nearest to the gauge support surface 302 and a smaller perimeter nearest to the second forming surface 314, i.e., the locating portion 304 may be larger than the composite sheet 140 and tapered to allow gravitational assistance for the alignment of the composite sheet 140. It is noted that vacuum pressure may be applied, alternatively or in combination with the locating portion 304, to the composite sheet 140 to align the composite sheet 140 with the die opening 310 or any of its constituents (e.g., by applying a vacuum pressure from the outer mandrel 210 and/or the inner mandrel 220).

Referring again to FIG. 9, the die opening 310 may cooperate with the mandrel assembly 200 to shape the composite sheet 140. The die opening 310 may be a passage disposed within the die assembly 300. The die opening 310 may comprise a third forming surface 312 that intersects with a second forming surface 314 at a bending angle β. In one example, the die opening 310 may have a substantially uniform cross-section that defines the third forming surface 312, i.e., the cross-section is substantially similar along the Y-axis. While the die opening 310 is depicted as having a substantially circular cross-section, the die opening 310 may have a cross-section that is substantially circular, triangular, rectangular, quadrangular, pentagonal, hexagonal or elliptical. The bending angle β may be from about 1.31 radians to about 1.83 radians such as, for example, from about 1.48 radians to about 1.66 radians or about 1.57 radians. The die opening 310 may be configured to accept the inner mandrel 220. Thus, the bending angle β may be set such that the sum of the forming angle Φ and the bending angle β equals about 3.14 radians. Moreover, the die opening 310 may have a substantially similar cross-section as the inner mandrel 220, i.e., the third forming surface 312 of the die opening 310 may be configured to accept and be offset at a controlled distance from the second mandrel surface 224 of the inner mandrel 220.

Referring back to FIGS. 3-8, the sealing members 320 may be configured to provide heat and pressure for heat sealing. The sealing members 320 may be positionable between a sealing position (FIGS. 3, 4 and 8) and an open position (FIGS. 5-7), i.e., when in the sealing position, sealing members 320 are in contact with a work piece and when in the open position, the sealing members 320 are not in contact with the work piece. For example, the sealing members 320 may be rotatably coupled to the die assembly 300. The sealing members 320 may be complimentarily shaped to one another such that, when the sealing members 320 are in the sealing position, the sealing members substantially surround the work piece in a puzzle like manner. Specifically, as depicted in FIG. 8, when sealing a composite bottom 40 to a composite body 10, the sealing members 320 may compress the bottom end 18 of the composite body 10 along a substantially complete perimeter of the exterior surface 16. When the composite body 10 has a substantially circular cross-section, a circumference of the composite body 10 may be compressed substantially evenly by the sealing members 320, i.e., three sealing members 320 may each cover about 2.09 radians of the full circumference. It is noted that any number of sealing members 320 may be utilized such as, for example, from about 2 to about 10. Moreover, the sealing members 320 may each cover substantially equal segments of the composite body or may cover substantially non-equal segments (e.g., for a circular cross section and four sealing members, the first sealing member may cover 0.35 radians, the second sealing member may cover 0.87 radians, the third sealing member may cover 2.09 radians, and the fourth sealing member may cover 2.97 radians).

The sealing member 320 may be utilized to compress and heat a work piece in order to perform a heat sealing operation. Each sealing member 320 may provide conductive heating to a work piece of up to about 300° C. Moreover, the sealing member 320 may apply a pressure of up to about 30 MPa to a work piece. As is noted above, a plurality of sealing members 320 may be utilized to heat seal (e.g., by applying heat and pressure) the bottom end 18 of the composite body 10 to a composite bottom 40. As depicted in FIG. 3, the sealing members 320 may be adjacent to one another. It is possible for sealing members 320 to form pleats in the composite bottom 10 when multiple sealing members 320 come into contact near the same portion of the composite bottom 10. Accordingly, it may be desirable to reduce the number of sealing members 320 and/or control the dimensions of the sealing members 320.

The tube support assembly 400 may be configured to retrieve a composite body 10 and hold the composite body 10 in a desired location. The tube support assembly 400 may comprise a tube support member 402 that is shaped to accept the composite body 10. In one example, the mandrel assembly 200, the die assembly 300, and the tube support assembly 400 may be aligned along the Y-axis such that a composite sheet 140 may be urged through the die opening 310 by the inner mandrel 220 and inserted into the bottom end 18 of a composite body 10 held by the tube support member 402.

FIGS. 5-11 generally depict methods for forming composite containers for storing perishable products. In one example, a method for forming a composite container generally comprises deforming a composite sheet into a deformed sheet, forming the deformed sheet into a composite bottom, and forming a hermetic seal between the composite bottom and a composite body.

Referring again to FIGS. 5, 9 and 10, a composite sheet 140 may be deformed into a deformed sheet 240. The composite sheet 140 may have an upper sheet surface 142 and a lower sheet surface 144 that define a sheet thickness 150. The composite sheet 140 may comprise the layered structure of the composite bottom 40 described hereinabove, i.e., a fiber layer, an oxygen barrier layer and a sealant layer. The composite sheet 140 may comprise an inner portion 146 and an outer portion 148. The inner portion 146 and the outer portion 148 may be substantially straight. For example, the composite sheet 140 may be cut or shaped into a disc. In further examples, the composite sheet 140 may be cut or formed into a domed disc (not depicted) such that the inner portion 146 is offset along the Y-axis from the outer portion 148.

The deformed sheet 240 may have a first deformed surface 242 and a second deformed surface 244 that define a deformed sheet thickness 258. The deformed sheet 240 may comprise the layered structure of the composite bottom 40 described hereinabove, i.e., a fiber layer, an oxygen barrier layer and a sealant layer. The deformed sheet 240 may further comprise an inner portion 246 and an outer portion 248. The inner portion 246 of the deformed sheet 240 may be substantially straight. A radius portion 250 may be disposed between the inner portion 246 and the outer portion 248 of the deformed sheet 240. The radius portion 250 may be shaped to define a radius angle $\theta_2$ as measured between the second deformed surface 244 of the inner portion 246 and the second deformed surface 244 of a first section 254 of the outer portion 248. The radius angle $\theta_2$ may be from about 1.31 radians to about 1.83 radians such as, for example, from about 1.48 radians to about 1.66 radians or about 1.57 radians. The outer portion 248 of the deformed sheet 240 may comprise an elastic radius 252 between the first section 254 and a second section 256 of the outer portion 248. The elastic radius 252 may be shaped to define an elastic angle $\alpha$ as measured between the first deformed surface 242 of the first section 254 and the first deformed surface 242 of the second section 256. The elastic angle $\alpha$ may be from any angle greater than or equal to about 1.57 radians such as, for example, from about 1.66 radians to about 2.0 radians.

In one example, the composite sheet 140 may be positioned adjacent to the die opening 310 of the die assembly 300 in order to allow for deformation into a deformed sheet 240. Specifically, the locating portion 304 may interact with the composite sheet 140 and position the outer portion 148 of the composite sheet 140 between the first forming surface 214 and the second forming surface 314. Once aligned, a portion (e.g., the outer portion 148) of the composite sheet 140 may be constrained between the first forming surface 214 and the second forming surface 314. The first forming surface 214 can be spaced a gap distance 110 from the second forming surface 314. As is noted above, the gap distance 110 may be controlled by the interaction between the gap gauge 212 and the gauge support surface 302. For example, the gap gauge 212 and the gauge support surface 302 may remain in contact throughout the forming process such that the gap distance 110 is held substantially constant.

While the outer portion 148 of the composite sheet 140 is constrained by the first forming surface 214 and the second forming surface 314, the motion of the outer portion 148 of the composite sheet 140 along the Y-axis may be limited by the gap distance 110. When the gap distance 110 is relatively large, the outer portion 148 of the composite sheet 140 may move a greater distance along the Y-axis. Conversely, when the gap distance 110 is relatively small, the outer portion 148 of the composite sheet 140 may move a shorter distance along the Y-axis. Moreover, as the gap distance 110 increased the elastic angle $\alpha$ may be increased. Accordingly, the gap distance 110 may be any distance that is substantially equal to or greater than the sheet thickness 150 of the composite sheet 140. For example, the gap distance 110 may be from about 1 times the sheet thickness 150 of the composite sheet 140 to about 5 times the sheet thickness 150 of the composite sheet 140.

The composite sheet 140 may be urged through the die opening 310 and along the third forming surface 312 to shape the composite sheet 140 (FIG. 9) into a deformed sheet 240 (FIG. 10). In one example, pressure may be applied to the lower sheet surface 144 by the first mandrel surface 222 of the inner mandrel 220 (e.g., by actuating the inner mandrel 220 along the positive Y-direction). Referring to FIG. 9, upon initiating the application of pressure to the lower sheet surface 144 and transitioning the inner mandrel 220 to the die opening 310, the shortest distance $\Delta$ between any portion of the inner mandrel 220 and the die opening 310 may be controlled. When the inner mandrel 220 contacts (i.e., initiates the transfer of energy) the composite sheet 140 and the composite sheet 140 begins to be urged through the die opening 310, the shortest distance $\Delta$ between the inner mandrel 220 and the die opening 310 may be m times the sheet thickness 150 where m is any value from about 1 to about 5 such as, for example, from about 1 to about 3.5 or from about 1 to about 2. Moreover, when the inner mandrel 220 contacts the composite sheet 140 and moves towards the die opening 310, the shortest distance $\Delta$ between the inner mandrel 220 and the die opening 310 may be n times the sheet thickness 150 where n is any value from about 1 to about 5 such as, for example, from about 1 to about 3.5 or from about 1 to about 2, until any portion of the inner mandrel 220 extends past the die opening 310 (e.g., until any portion of the inner mandrel 220 extends beyond a plane defined by the die opening 310).

Referring again to FIG. 10, when the shaped portion 230 of the inner mandrel 220 enters the die opening 310, the location along the first mandrel surface 222 that intersects with the shaped portion 230 can be spaced a shaped distance 232 from the third forming surface 312. The shaped portion 230 may constrain the deformed sheet 240 near the radius portion 250. The shaped portion and the shaped distance 232 may define the shape of the radius portion 250 of the deformed sheet 240. Accordingly, the shaped distance may be equal to k times the sheet thickness 150 where k is any value less than about 15 such as, for example, from about 1 to about 10 such as, for example, from about 1 to about 5 or from about 1 to about 3.

The shape of the deformed sheet 240 may further be defined by a wall distance 234. When the inner mandrel 220 extends past the die opening 310 (FIG. 6), the inner mandrel 220 may be at least partially surrounded by the third forming surface 312. The first section 254 of the outer portion 248 of the deformed sheet 240 may be constrained between the third forming surface 312 and the second mandrel surface 224. The wall distance 234 may be defined as the distance from the third forming surface 312 and the second mandrel surface 224, when the inner mandrel 220 extends past the die opening 310. Accordingly, the shape of the radius portion 250 and the elastic radius 252 may depend upon the wall distance 234. Suitable, values for the elastic angle $\alpha$ and radius angle $\theta_2$ may be achieved when the wall distance 234 is substantially equal to or greater than the sheet thickness 150 (FIG. 9). For example, the wall distance 234 may be equal to j times the sheet thickness 150 where j is from about 1 to about 3 such as, for example, from about 1 to about 2. In a further example, the elastic angle $\alpha$ may be greater than the bending angle $\beta$ and radius angle $\theta_2$ may be greater than the forming angle $\Phi$.

Referring collectively to FIGS. 10 and 11, the elastic radius 252 may be removed from the outer portion 248 of the deformed sheet 240 to form a composite bottom 40 having a sealing portion 48 that is substantially flat. In one example, the deformed sheet 240 may be urged beyond the die opening 310 such that the outer portion 248 of the deformed sheet 240 is no longer constrained by the first forming surface 214 and the second forming surface 314. Specifically, the inner mandrel 220 may travel in the positive Y-direction and transition the outer portion 248 of the deformed sheet 240 into the sealing portion 48 of the composite bottom 40. Moreover, the radius angle $\theta_2$ of the deformed sheet 240 may transition to the radius angle $\theta_1$ of the composite bottom 40 because the sealing portion of the composite bottom 40 may be constrained by the second mandrel surface 224 and the third forming surface 312 and not the first forming surface 214 and the second forming surface 314.

Referring collectively to FIGS. 2 and 7, the composite bottom 40 may be inserted into the bottom end 18 of a composite body 10. In one example, the composite bottom 40 may be urged into the composite body such that the platen portion 46 of the composite bottom 40 is recessed with respect to the bottom edge 22 of the composite body. The composite bottom 40 may be at least partially surrounded by the bottom end 18 of the composite body. For example, the inner mandrel 220 may travel in the positive Y-direction at least until the first mandrel surface 222 extends beyond the bottom edge 22 of the composite body 10. Accordingly, the composite bottom 40 may be completely recessed within the composite body 10 such that the edge distance $Y_1$ is positive or the composite bottom 40 may be partially recessed within the composite body 10 such that the edge distance $Y_1$ is negative.

The composite bottom 40 may be sealed to the composite body 10 such that the composite bottom 40 is hermetically sealed to the composite body 10. Specifically, compression and heat may be applied to the composite bottom 40 and/or the composite body 10 such that their respective sealant layers form a hermetic seal. Referring collectively to FIGS. 7 and 8, the sealing members 320 may contact (FIG. 8) the bottom end 18 of the composite body 10. The inner mandrel 220 may be heated to a temperature substantially equal to the temperature of the sealing members 320. As the sealing members 320 contact the exterior surface 16 of the composite body, the composite body 10 and the composite bottom 40 may be compressed between the second mandrel surface 224 and the sealing members 320. After compression and heat has been applied for a sufficient dwell time, the sealing members 320 may be moved away from the bottom end 18 of the composite body 10 such that the sealing members 320 are not in contact with the composite body 10 (FIG. 7) after the dwell time expires.

Hermetic seals, according to the present disclosure, may be formed by sealing members at a temperature greater than about 90° C. such as, for example, 120° C. to about 280° C. or from about 140° C. to about 260° C. Suitable hermetic seals may be formed by keeping the sealing member in contact with the bottom end 18 of the composite body 10 for any dwell time sufficient to heat a sealant layer to a temperature suitable for forming a hermetic seal such as, for example, less than about 4 seconds, from about 0.7 seconds to about 4.0 seconds or from about 1 second to about 3 seconds. The composite bottom 40 and the bottom end 18 of the composite body 10 may be compressed between the sealing members 320 and the inner mandrel 220 with any pressure less than about 30 MPa such as a pressure from about 1 MPa to about 22 MPa.

In further examples, a plurality of composite containers may be formed by a system or device suitable for processing multiple composite sheets, composite bottoms and composite containers in a synchronized manner. For example, a manufacturing system may include a plurality of mandrel assemblies, a plurality of die assemblies, and a plurality of tube support assemblies operating in a coordinated manner. Specifically, a turreted device with a plurality of sub assemblies wherein each sub assembly comprises a mandrel assembly, a die assembly, and a tube assembly may accept composite sheets and process the composite sheets simultaneously or synchronously. Depending upon the complexity of the turreted device up to many hundreds of separate composite containers may be manufactured per cycle in a coordinated manner. Thus, any of the processes described herein may be performed contemporaneously. For example, when each sub assembly operates in a synchronous manner each of the following may be performed contemporaneously: a first composite sheet may be positioned above a die opening; a second composite sheet may be constrained between a mandrel assembly and a die assembly; a third composite sheet may be formed into a first composite bottom; a second composite bottom may be inserted into a first composite body; and a third composite bottom may be hermetically sealed to a second composite body. Alternatively, any of the operations described herein may be performed simultaneously such as, for example, by a device having a plurality of sub assemblies.

It should now be understood that the present disclosure provides for hermetically closed containers for packaging humidity sensitive and/or oxygen sensitive solid food products such as, for example, crisp carbohydrate based food products, salted food products, crisp food products, potato chips, processed potato snacks, nuts, and the like. Such hermetically closed containers may provide a hermetic closure under widely varying climate conditions of high and low temperature, high and low humidity, and high and low pressure. Moreover, the hermetically closed containers can be manufactured according to the methods described herein via processes involving conductive heating technology with relatively low environmental pollution. The hermetically closed containers described herein may have high structural stability at low weight and be suitable for recycling.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Furthermore, it is noted that directional references such as, for example, upper, lower, top, bottom, inner, outer, X-direction, Y-direction, X-axis, Y-axis, and the like have been provided for clarity and without limitation. Specifically, it is noted such directional references are made with respect to the coordinate system depicted in FIGS. 1-11. Thus, the directions may be reversed or oriented in any direction by making corresponding changes to the provided coordinate system with respect to the structure to extend the examples described herein.

While particular examples have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A composite container for storing perishable products comprising a composite body and a composite bottom, wherein:

the composite body is formed into a partial enclosure having an interior surface and an exterior surface, wherein the interior surface and the exterior surface extend from a bottom end of the composite body to a top end of the composite body and the bottom end of the composite body terminates at a bottom edge of the composite body;

the composite bottom comprises a bottom fiber layer, a bottom oxygen bather layer, and a bottom sealant layer, such that the composite bottom has an upper surface and a lower surface; and the composite bottom comprises a platen portion connected to a sealing portion; a hermetic seal is formed between the sealing portion of the composite bottom and the interior surface of the composite body.

2. The composite container of claim 1 further comprising a closure seal hermetically sealed to the top end of the composite body wherein:

an internal volume is enclosed by the interior surface of the composite body, the closure seal, and the upper surface of the composite bottom; and a solid food product stored within the internal volume is shelf stable for 3 months such that a moisture gain of the solid food product is less than 1% per gram of the solid food product.

3. The composite container of claim 1 wherein a thickness of the hermetic seal measured from the exterior surface of the composite body to the lower surface of the composite bottom is from about 0.0635 cm to about 0.16 cm.

4. The composite container of claim 1 wherein the composite bottom is recessed inside the composite body such that the platen portion measured from the lower surface of the composite bottom is spaced is from about 2 mm to about 40 mm away from the bottom edge of the composite body.

5. The composite container of claim 1 wherein the composite body is a spirally wound or a longitudinally wound tubular body.

6. The composite container of claim 1 wherein a cross-sectional shape of the composite body is substantially circular, triangular, quadrangular, pentagonal, hexagonal or elliptical.

7. The composite container of claim 1 wherein the hermetic seal has a leakage rate equivalent to a hole diameter of less than about 300 μm.

8. The composite container of claim 1 wherein the composite container has a leakage rate equivalent to a hole diameter of less than about 300 μm.

9. The composite container of claim 1 wherein the composite container is hermetic.

10. The composite container of claim 9 wherein an oxygen transmission rate of the composite container is less than about 50 $cm^3$ of $O_2$ per $m^2$ when subjected to ambient conditions of air at 22.7° C. and 50% relative humidity.

11. The composite container of claim 1 wherein the composite container has a water vapor transmission rate of less than about 0.1725 grams per $m^2$ per day when subjected to ambient conditions of air at 26.7° C. and 80% relative humidity.

12. The composite container of claim 11 wherein the bottom fiber layer has a total area weight from about 130 $g/m^2$ to about 450 $g/m^2$.

13. A composite container for storing perishable products comprising a composite body and a composite bottom, wherein:

the composite body is formed into a partial enclosure having an interior surface and an exterior surface, wherein the interior surface and the exterior surface extend from a bottom end of the composite body to a top end of the composite body and the bottom end of the composite body terminates at a bottom edge of the composite body;

the composite bottom comprises a platen portion, a radius portion, and a sealing portion, wherein the platen portion extends to the radius portion and the radius portion extends to the sealing portion such that the radius portion forms a radius angle between the platen portion and the sealing portion;

the composite bottom comprises a bottom fiber layer, a bottom oxygen bather layer, and a bottom sealant layer, such that the composite bottom has an upper surface and a lower surface;

the upper surface of the composite bottom and the lower surface of the composite bottom terminate at a lower edge of the composite bottom;

at least a portion of the composite bottom is recessed inside the composite body such that the lower edge of the composite bottom is spaced an edge distance away from the bottom edge of the composite body; and a hermetic seal is formed between the sealing portion of the composite bottom and the interior surface of the composite body.

14. The composite container of claim 13 wherein the composite bottom further comprises polyethylene resin, vinyl acetate, acrylate, methacrylate monomers, or an ethylene based copolymer having grafted functional groups.

15. The composite container of claim 13 wherein the composite bottom has a density of less than about 2.5 $g/m^3$.

16. The composite container of claim 13 wherein the composite bottom has a modulus of elasticity of less than about 35 GPa.

17. The composite container of claim 13 wherein the bottom fiber layer has a thermal conductivity from about 0.04 W/Km to about 0.3 W/Km.

18. The composite container of claim 13 wherein the bottom oxygen bather layer has a thermal conductivity from about 200 W/Km to about 300 W/Km.

19. The composite container of claim 13 wherein the bottom sealant layer has a thermal conductivity from 0.3 W/Km to about 0.6 W/Km.

20. The composite container of claim 13 wherein the bottom oxygen bather layer comprises aluminum.

21. The composite container of claim 13 wherein the bottom sealant layer is heat-sealable from about 90° C. to about 200° C.

22. The composite container of claim 13 wherein the radius angle is about 1.3 radians to about 2 radians.

23. The composite container of claim 13 wherein the hermetic seal has a leakage rate equivalent to a hole diameter of less than about 300 μm.

24. The composite container of claim 13 wherein the composite container is hermetic.

25. The composite container of claim 24 wherein an oxygen transmission rate of the composite container is less than about 50 $cm^3$ of $O_2$ per $m^2$ when subjected to ambient conditions of air at 22.7° C. and 50% relative humidity.

26. The composite container of claim 13 wherein the composite container has a water vapor transmission rate of less than about 0.1725 grams per $m^2$ per day when subjected to ambient conditions of air at 26.7° C. and 80% relative humidity.

27. A composite container for storing perishable products comprising a composite body, a closure seal and a composite bottom, wherein:

the composite body is formed into a partial enclosure having an interior surface and an exterior surface, wherein the interior surface and the exterior surface extend from a bottom end of the composite body to a top end of the composite body;

the composite body comprises a body sealant layer that forms at least a portion of the interior surface of the composite body;

the closure seal is hermetically sealed to the body sealant layer at the top end of the composite body;

the composite bottom comprises a bottom fiber layer, a bottom oxygen bather layer, and a bottom sealant layer, such that the composite bottom has an upper surface and a lower surface;

the bottom sealant layer of the composite bottom is hermetically sealed to the body sealant layer at the bottom end of the composite body;

an internal volume is enclosed by the interior surface of the composite body, the closure seal, and the upper surface of the composite bottom; and a solid food product stored within the internal volume is shelf stable for 12 months such that a moisture gain of the solid food product is less than 1% per gram of the solid food product.

28. The composite container of claim 27 wherein when an internal pressure is applied to the interior surface of the composite body and the upper surface of the composite bottom, an external pressure is applied to the exterior surface of the composite body and the lower surface of the composite bottom, and the internal pressure is about 20 kPa greater than the external pressure, the composite bottom does not extend beyond the bottom end of the composite body.

29. The composite container of claim 27 wherein an oxygen transmission rate of the composite container is less than about 50 $cm^3$ of $O_2$ per $m^2$ when subjected to ambient conditions of air at 22.7° C. and 50% relative humidity.

* * * * *